US007706939B2

(12) United States Patent
Noguchi

(10) Patent No.: US 7,706,939 B2
(45) Date of Patent: Apr. 27, 2010

(54) DATA RECORDING APPARATUS AND SHUT-DOWN METHOD FOR DATA RECORDING APPARATUS

(75) Inventor: Kiyoshige Noguchi, Tokyo (JP)

(73) Assignee: Fuji Jukogyo Kabushiki Kaisha, Shinjuku-ku, Tokyo (JP)

( * ) Notice: Subject to any disclaimer, the term of this patent is extended or adjusted under 35 U.S.C. 154(b) by 1012 days.

(21) Appl. No.: 11/065,483

(22) Filed: Feb. 25, 2005

(65) Prior Publication Data

US 2005/0192723 A1 Sep. 1, 2005

(30) Foreign Application Priority Data

Feb. 27, 2004 (JP) .......................... P2004-055046

(51) Int. Cl.
*G01M 19/00* (2006.01)

(52) U.S. Cl. .......................... 701/35; 701/29; 701/112; 701/115; 340/438

(58) Field of Classification Search .................. 701/35, 701/29, 112, 115; 340/438
See application file for complete search history.

(56) References Cited

U.S. PATENT DOCUMENTS

| | | | | |
|---|---|---|---|---|
| 4,258,421 | A * | 3/1981 | Juhasz et al. | 701/35 |
| 4,307,455 | A * | 12/1981 | Juhasz et al. | 714/24 |
| 4,698,748 | A * | 10/1987 | Juzswik et al. | 713/322 |
| 4,939,652 | A * | 7/1990 | Steiner | 701/35 |
| 5,485,625 | A * | 1/1996 | Gumkowski | 713/323 |
| 6,347,276 | B1 * | 2/2002 | Avery, Jr. | 701/112 |
| 6,584,571 | B1 * | 6/2003 | Fung | 713/310 |
| 2002/0035422 | A1 * | 3/2002 | Sasaki | 701/35 |
| 2002/0072838 | A1 * | 6/2002 | McClellan et al. | 701/35 |
| 2002/0161496 | A1 * | 10/2002 | Yamaki | 701/33 |
| 2003/0033067 | A1 * | 2/2003 | Arita et al. | 701/48 |
| 2003/0095688 | A1 * | 5/2003 | Kirmuss | 382/105 |
| 2004/0143695 | A1 * | 7/2004 | Hashimoto et al. | 711/1 |
| 2005/0083404 | A1 * | 4/2005 | Pierce et al. | 348/148 |
| 2006/0047384 | A1 * | 3/2006 | Robinson et al. | 701/35 |
| 2008/0234878 | A1 * | 9/2008 | Joao | 701/2 |

FOREIGN PATENT DOCUMENTS

| | | |
|---|---|---|
| CA | 2 229 425 | 9/1999 |
| DE | 100 09 770 | 9/2001 |
| GB | 2 015 213 | 9/1979 |
| JP | 10-20970 | 1/1998 |
| JP | 2002-70637 | 3/2002 |

OTHER PUBLICATIONS

European Search Report dated Jun. 29, 2006.

* cited by examiner

*Primary Examiner*—Khoi Tran
*Assistant Examiner*—Nikhil Sriraman
(74) *Attorney, Agent, or Firm*—McGinn Intellectual Property Law Group, PLLC

(57) ABSTRACT

In a data recording apparatus for recording control parameters in a control unit in a vehicle, it is determined whether or not the control unit has terminated an operation for outputting control parameters to be recorded. Then, when it is determined that the control unit has terminated the operation, shut-down processing is executed at a timing at which the termination of the operation is determined for shutting down a power supply to the data recording apparatus.

25 Claims, 7 Drawing Sheets

FIG. 3

| MODE FILE | ACQUISITION CONTENTS | ACQUISITION CONDITION | OPERATING CONDITION |
|---|---|---|---|
| A | 1. ENGINE ROTATION SPEED<br>2. VEHICLE SPEED<br>3. INTAKE PIPE PRESSURE<br>4. IGNITION ADVANCED ANGLE<br>5. FUEL INJECTION PULSE WIDTH<br>6. IDLE CONTROL VALVE CONTROL AMOUNT<br>7. ENGINE COOLANT TEMPERATURE | TRIGGER CONDITION:<br>(1) ENGINE ROTATION SPEED = 0rpm<br>(2) CHANGING AMOUNT IN ENGINE ROTATION SPEED IS EQUAL TO OR MORE THAN PREDETERMINED VALUE<br>RECORDING TIME:<br>(1), (2) 10 MIN. BEFORE AND AFTER ESTABLISHMENT OF CONDITION<br>SAMPLING RATE:<br>(1) HIGHEST (2) HIGHEST | (i) TIMING AT WHICH ECU TERMINATES<br>(ii) COMPLETION OF DATA RECORDING |
| B | 1. ENGINE ROTATION SPEED<br>2. VEHICLE SPEED<br>3. INTAKE PIPE PRESSURE<br>4. IGNITION ADVANCED ANGLE<br>5. FUEL INJECTION WIDTH<br>6. IDLE CONTROL VALVE CONTROL AMOUNT<br>7. ENGINE COOLANT TEMPERATURE<br>8. START-TIME FUEL CONTROL<br>9. START-TIME IGNITION CONTROL<br>10. BATTERY VOLTAGE | TRIGGER CONDITION:<br>(1) IGNITION SWITCH TURNED ON (OR POWER ON RECORDING APPARATUS)<br>RECORDING TIME:<br>(1) 10 MIN. BEFORE AND AFTER ESTABLISHMENT OF CONDITION<br>SAMPLING RATE:<br>(1) 1 MIN. FROM START OF RECORDING → HIGHEST, FROM 1 MIN. TO 10 MIN. → EVERY SECONDS | (i) TIMING AT WHICH ECU TERMINATES<br>(ii) COMPLETION OF DATA RECORDING |
| C | 1. ENGINE ROTATION SPEED<br>2. VEHICLE SPEED<br>3. INTAKE PIPE PRESSURE<br>4. IGNITION ADVANCED ANGLE<br>5. FUEL INJECTION WIDTH<br>6. G-SENSOR VALUE<br>7. AT GEAR POSITION<br>8. IGNITION LEARNING VALUE (LEARNING MAP)<br>9. FUEL LEARNING VALUE (LEARNING MAP)<br>10. PEROPHERAL INFORMATION | TRIGGER CONDITION:<br>(1) DETERMINATION ON MISFIRING<br>(2) FIRST AND LAST OF DATA ACQUISITION (CONTENTS 8, 9, 10)<br>RECORDING TIME:<br>(1) 10 MIN. BEFORE ESTABLISHMENT OF CONDITION<br>(2) ONCE UPON ESTABLISHMENT OF CONDITION<br>SAMPLING RATE:<br>(1) HIGHEST | (i) TIMING AT WHICH ECU TERMINATES<br>(ii) COMPLETION OF DATA RECORDING |
| D | 1. ENGINE ROTATION SPEED<br>2. VEHICLE SPEED<br>3. INTAKE PIPE PRESSURE<br>4. IGNITION ADVANCED ANGLE<br>5. FUEL INJECTION WIDTH | TRIGGER CONDITION:<br>(1) TURN ON MIL<br>RECORDING TIME:<br>(1) 10 MIN. BEFORE AND AFTER ESTABLISHMENT OF CONDITION<br>SAMPLING RATE:<br>(1) EVERY SECONDS | (i) TIMING AT WHICH ECU TERMINATES<br>(ii) COMPLETION OF DATA RECORDING |
| ⋮ | ⋮ | ⋮ | ⋮ |

DATA RECORDING APPARATUS AND SHUT-DOWN METHOD FOR DATA RECORDING APPARATUS

The present application claims foreign priority based on Japanese Patent Application P.2004-055046, filed Feb. 27, 2004, the contents of which are incorporated herein by reference.

BACKGROUND OF THE INVENTION

The invention relates to a data recording apparatus and a shut-down method for a data recording apparatus, and more particularly, to a technique for shutting down an apparatus for recording control parameters in a control unit mounted in a vehicle.

Conventionally, a data recording apparatus, for loading and recording control parameters of a control unit mounted in a vehicle in order to identify a faulty condition of the vehicle, is known. For example, JP-A-2002-070637 discloses a data recording apparatus which effectively utilizes a limited storage capacity to reliably and efficiently record data for a control unit. This data recording apparatus chronologically samples a variety of data (i.e., control parameters) in the control unit of a vehicle. Then, a sequence of sampling data is stored in a data recording section upon establishment of a predetermined trigger condition which corresponds to a condition under which effective data can be acquired for identifying a faulty condition of the vehicle. The data recording apparatus continues to executes such a recording operation over operation cycles of the vehicle, and switches to a sleep mode in four minutes after an ignition switch is turned off for power saving.

However, if the data recording apparatus switches to the sleep mode in a predetermined time after the ignition switch of the vehicle is turned off, it is difficult to achieve the compatibility between an improvement in the reliability of recorded data and a reduction of power consumption in a battery. This is because a situation takes place where a timing at which the data recording apparatus switches to the sleep mode is different from a timing at which the controller terminates the operation. Each controller contained in a vehicle terminates its operation at a timing which is set on an individual basis. Thus, when a controller terminates the operation before the data recording apparatus switches to the sleep mode, the power stored in the battery will be consumed for nothing. On the other hand, when the data recording apparatus switches to the sleep mode even though a controller is still operating, a situation takes place where the data recording apparatus terminates a recording operation even though data should be still recorded.

SUMMARY OF THE INVENTION

The invention has been made in view of such circumstances, and the object is to achieve the compatibility between an improvement on the reliability of recorded data and a reduction in power consumption of a battery.

To solve the problems, a first aspect of the present invention provides a data recording apparatus for recording a control parameter in a control unit mounted in a vehicle. This data recording apparatus has a determination section for determining whether or not the control unit has terminated an operation for outputting the control parameter to be recorded, and a control section responsive to the determination section which determines that the control unit has terminated the operation, for executing shut-down processing for shutting down a power supply to the data recording apparatus at a timing at which the termination of the operation is determined.

In the first aspect, the determination section preferably outputs a data request signal to the control unit which outputs the control parameter to be recorded, and determines that the control unit continues to operate when the determination section receives data in response to the data request signal, and determines that the control unit has terminated the operation when the determination section does not receive data in response to the data request signal.

A second aspect of the present invention provides a data recording apparatus for recording a control parameter in a control unit equipped in a vehicle. This data recording apparatus has a determination section for determining whether or not the control unit has terminated an operation for outputting the control parameter to be recorded, a detection section for detecting a signal outputted from the vehicle in association with an ignition switch which is turned off, and a control section having switchable shut-down modes including a first shut-down mode and a second shut-down mode, wherein the control section is responsive to a determination made by the determination section that the control unit has terminated the operation, for executing shut-down processing for shutting down a power supply to the data recording apparatus at a timing at which the termination of the operation is determined in the first shut-down mode, and the control section is responsive to a detection made by the detection section of a signal generated in association with the ignition switch which is turned off for executing the shut-down processing at a timing at which the detection is made in the second shut-down mode. In this configuration, the control section switches the first shut-down mode and the second shut-down mode in accordance with acquisition contents indicative of the type of the control parameter to be recorded, and an acquisition condition indicative of a condition under which the control parameter can be acquired for effectively identifying a faulty condition of the vehicle.

A third aspect of the present invention provides a method of shutting down a recording apparatus for recording a control parameter in a control unit equipped in a vehicle. This shut-down method has a first step of determining whether or not the control unit has terminated an operation for outputting the control parameter to be recorded, and a second step of, when determining that the control unit has terminated the operation, executing shut-down processing for shutting down a power supply to the data recording apparatus at a timing at which the termination of the operation is determined.

In the third aspect, the first step preferably includes the steps of outputting a data request signal to the control unit which outputs the control parameter to be recorded, determining that the control unit continues to operate when the determination section receives data in response to the data request signal, and determining that the control unit has terminated the operation when the determination section does not receive data in response to the data request signal.

Further, a fourth aspect of the present invention provides a method of shutting down a recording apparatus for recording a control parameter in a control unit equipped in a vehicle. This shut-down method has a first step of providing a first shut-down mode and a second shut-down mode for switchable shut-down modes, and switching the first shut-down mode and the second shut-down mode in accordance with acquisition contents indicative of the type of the control parameter to be recorded, and an acquisition condition indicative of a condition under which the control parameter can be acquired for effectively identifying a faulty condition of the vehicle, and a second step of executing processing in accordance with the switched shut-down mode. In this method, the second step has the steps of determining whether or not the control unit has terminated an operation for outputting the control parameter to be recorded, and executing shut-down processing when determining that the control unit has terminated the operation, for shutting down a power supply to the data recording apparatus at a timing at which the termination of the operation is determined in the first shut-down mode, and detecting a signal outputted from the vehicle in association with an ignition switch which is turned off, and executing the shut-down processing when detecting the signal generated in association with the ignition switch which is turned off at a timing at which the signal is detected in the second shut-down mode.

According to the invention, it is determined whether or not the control unit has terminated an operation for outputting a control parameter to be recorded. Then, when it is determined that the operation of the control unit has been terminated, the shut-down processing is executed for shutting down the power supply to the data recording apparatus at a timing at which the termination of the operation is determined. In this way, the termination of the operation of the control unit corresponds in timing to the termination of the operation of the data recording apparatus. This can reduce the occurrence of an event of failing to record necessary data, and reduce the occurrence of an event of uselessly consuming the power stored in a battery. Consequently, the compatibility can be achieved between an improvement in the reliability of recorded data and a reduction of power consumption in a battery.

BRIEF DESCRIPTION OF THE DRAWINGS

FIG. 3 is an explanatory diagram showing an example of a mode file.

DESCRIPTION OF THE PREFERRED EMBODIMENTS

First Embodiment

Figure 1:
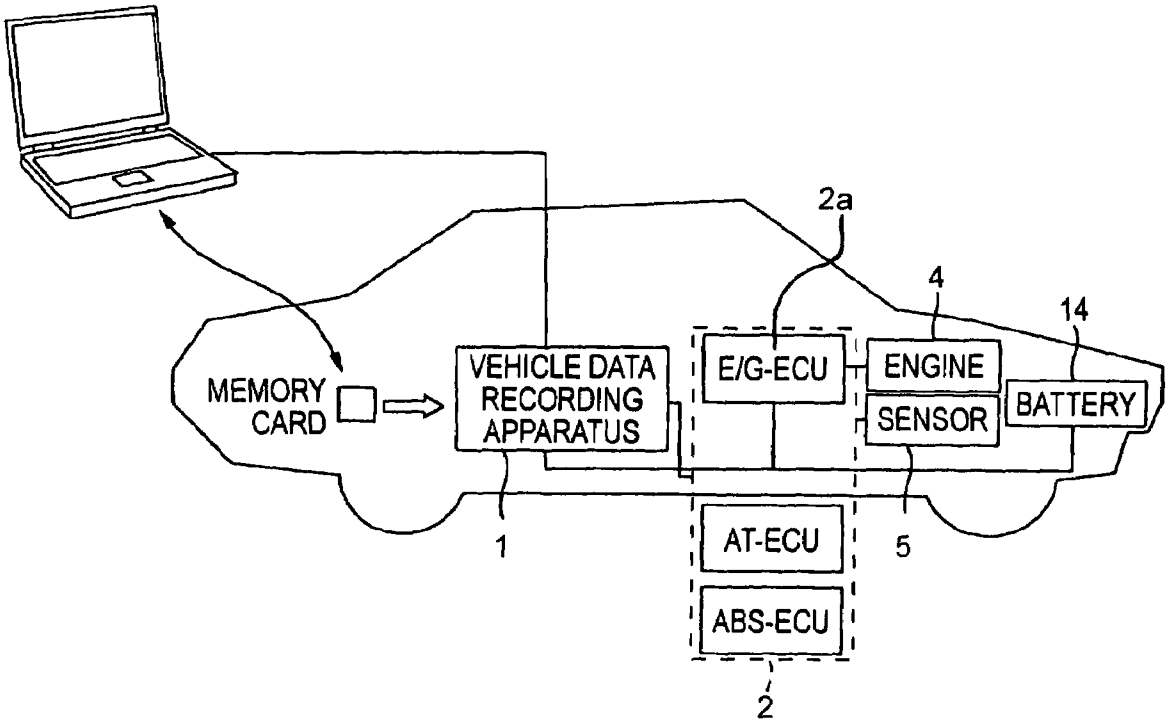
FIG. 1 is an explanatory diagram of a vehicle to which a data recording apparatus according to the embodiments of the invention is applied.
Figure 2:
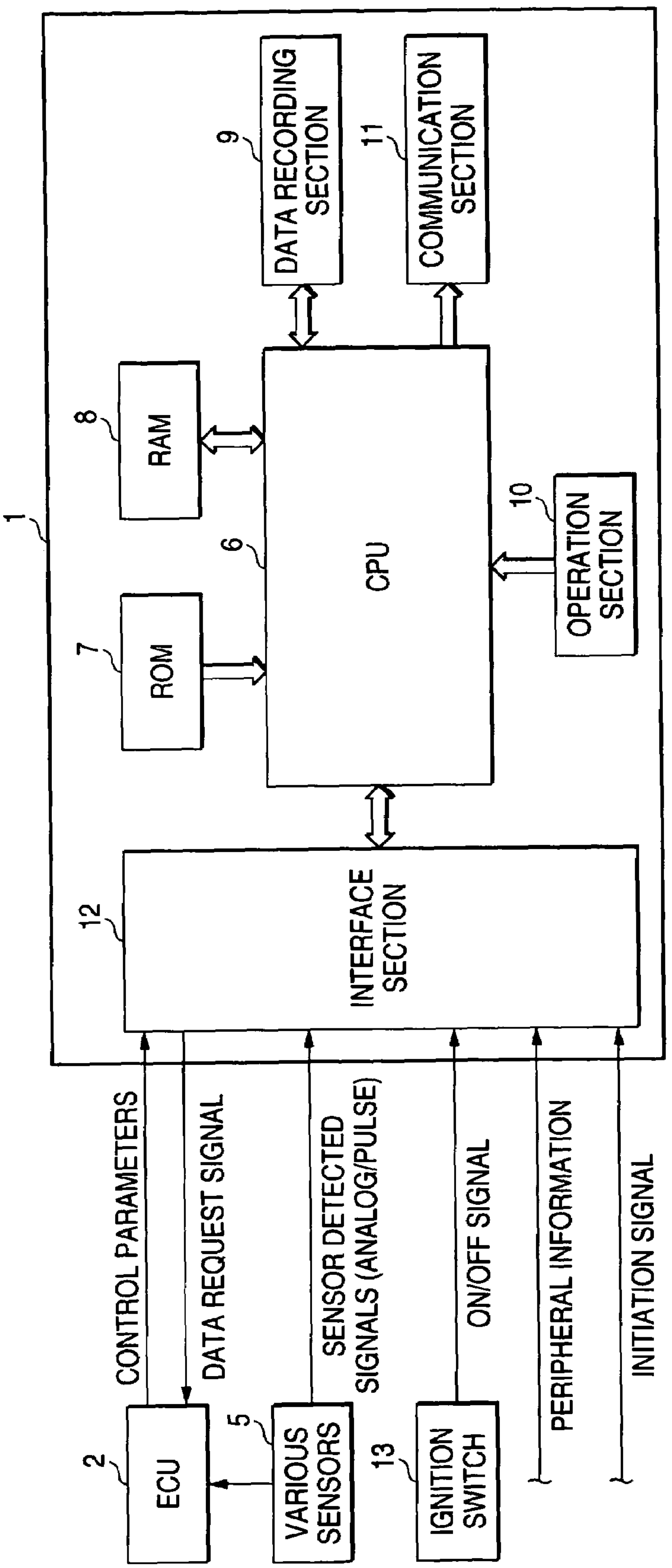
FIG. 2 is a block diagram illustrating the system configuration of the recording apparatus.

FIG. 1 is an explanatory diagram of a vehicle to which a data recording apparatus according to the embodiment is applied. FIG. 2 is a block diagram illustrating the system configuration of the recording apparatus and its relationship with various components of the vehicle. First, prior to description on the data recording apparatus 1 (hereinafter simply called the "recording apparatus"), description will be made on the vehicle to which the recording apparatus 1 is applied. This vehicle is equipped with an electronic control unit 2 (hereinafter called the "ECU") for controlling a variety of devices installed in the vehicle. The ECU 2 is centered at a microcomputer in configuration, and this embodiment will be described mainly in connection with an engine control unit 2*a* (hereinafter called "E/G-ECU") for controlling an engine 4, as a representative unit of the ECU 2. However, the invention can be applied similarly to a transmission control unit (AT-ECU) for controlling an automatic transmission; an ABS control unit (ABS-ECU) for controlling an anti-lock brake system; and the like. In this specification, the term "ECU" is used to collectively refer to these control units.

The ECU 2 is applied with sensor detected signals from a variety of sensors 5 for detecting the state of an object under control. This type of sensors 5 may include an intake air flow sensor, an intake pressure sensor, a vehicle speed sensor, an engine rotation speed sensor, a coolant temperature sensor, an acceleration sensor (G sensor), and the like. The ECU 2 performs operations associated with various control amounts based on the sensor detected signals in accordance with a previously set control program. Then, control amounts calculated by the operations are outputted to a variety of actuators. For example, the E/G-ECU 2*a* performs operations associated with a fuel injection width (fuel injection amount), an ignition timing, a throttle valve opening degree, and the like, and outputs control signals in accordance with the calculated control amounts to a variety of actuators. The respective ECUs 2 equipped in the vehicle are interconnected through K-Line (one standard of serial communication) or CAN (Controller Area Network), so that they can share their information through serial communications which are made by way of these communication lines. Each of the control units which make up the ECU 2 need not be commonly applied with all of the aforementioned sensor detected signals, but may be applied with sensor detected signals required by the respective control units to perform their controls.

The ECU 2 is also installed with a self diagnosis program for diagnosing faults in each component under control to automatically diagnose the operating states of the microcomputer and sensors 5 at an appropriate period. If a fault is recognized by the diagnosis, the ECU 2 generates a diagnosis code corresponding to the details on the fault, and stores the diagnosis code in a backup RAM of the ECU 2 at a predetermined address. The ECU 2 also performs alarming processing as required by turning on or blinking a MIL lamp or the like.

Next, description will be made on the recording apparatus 1 according to this embodiment. This recording apparatus 1 is a removable apparatus for recording a variety of data related to the vehicle (hereinafter called the "vehicle data"), and is equipped in the vehicle as required. The vehicle data recorded by the recording apparatus 1 may be control parameters for the ECU 2. Here, the "control parameters" are typically assumed to be control amounts calculated in the ECU 2, but also include parameters (engine rotation speed (rpm), vehicle speed (km/h), and the like) and learning value (control learning map) for use in calculating the control amounts. The recording apparatus 1 may also record sensor detected signals detected by a variety of sensors 5, and peripheral information of the vehicle, as information associated with the control parameters. The peripheral information of the vehicle is information related to the surroundings of the vehicle, and includes the temperature outside the vehicle, pressure outside the vehicle, altitude around the vehicle, absolute position (longitude, latitude), and the like.

The recording apparatus 1 is equipped in the vehicle when a periodic inspection is made, when the vehicle is carried into a service factory due to some fault found by the user, and the like. In the former case, the vehicle is subjected to a test run by a service man. In this event, the recording apparatus 1 acquires vehicle data in the test run period at all times, and records the acquired vehicle data as required. In the latter case, on the other hand, the vehicle is once returned to the user except for a case where the service man can readily identify the fault. In this even, the recording apparatus 1 acquires vehicle data at all times in a situation in which the user is normally operating the vehicle, and records the acquired vehicle data as required. After the test run conducted by the service man is terminated, or when the vehicle is again carried into the service factory, the recording apparatus 1 is removed from the vehicle. Then, the vehicle data recorded in the recording apparatus 1 is used for identifying the presence or absence of a fault experienced by the vehicle, or identifying the cause of the fault, if found.

Since the recording apparatus 1 is not normally equipped in the vehicle, there is no dedicated space previously ensured in the vehicle for installation, unlike the ECU 2. In this embodiment, the recording apparatus 1 is installed in a passenger's space (in the cabinet), and is electrically connected to a variety of cables provided in the vehicle. Here, from a viewpoint of mitigating works loaded on a service man, the recording apparatus 1 can be preferably mounted simply and in a short time, and from a viewpoint of safety, the recording apparatus 1 is preferably mounted in a place where the recording apparatus 1 does not prevent driving operations of the driver. Also, from a viewpoint of avoiding defective electric connections, the recording apparatus 1 is preferably fixed to the vehicle such that the recording apparatus 1 does not readily move during the running of the vehicle. In view of the foregoing aspects, in this embodiment, a velcro strap (hook and loop fastener) is attached on the recording apparatus 1 for mounting the recording apparatus 1 on a floor mat under a seat with the velcro strap. In this way, the recording apparatus 1 can be securely fixed with a high removability without impeding the driver in his driving operations. Other than using the velcro strap, means for fixing the recording apparatus may be bolts and screws used to fix the recording apparatus 1 to a seat frame under the seat.

FIG. 2 is a block diagram illustrating the system configuration of the recording apparatus 1. The recording apparatus 1 is mainly configured by a CPU 6. To a bus connected to the CPU 6, a ROM 7, a RAM 8, a data recording section 9, an operation Section 10, a communication section 11 and an interface section 12 are connected. The CPU 6 is basically charged with a function of determining whether or not the ECU 2 has terminated an operation for outputting control parameters which are to be recorded, and a function of executing shut-down processing for shutting down the power supply of the controller 1 at the timing at which the termination of the operation is determined. The RAM 8 forms a work area for temporarily storing a variety of processing data and the like processed by the CPU 6, and has a function of a buffer for temporarily storing vehicle data which has been chronologically acquired.

A sequence of vehicle data recorded In the RAM 8 is recorded in the data recording section 9, which is accessible by an external system, on the premise that a condition, later described, is established. In this embodiment, In consideration of the generality of data recorded in the data recording section 9, the data recording section 9 is implemented by a removable card type non-volatile memory, for example, a flash memory type memory card. Therefore, the recording apparatus 1 is provided with a socket (or a drive) which permits the CPU 6 to directly/indirectly access to the memory card. When the recording apparatus 1 is installed in a vehicle, the service man previously inserts a memory card into the socket. In this way, the CPU 6 can record vehicle data on the memory card which is equivalent to the data recording section 9, and read information recorded on the memory card. This type of memory cards includes a variety of storage media such as a SMART MEDIA, an SD memory card, and the like which can be used in the invention. These memory cards have a variety of recording capacities ranging from 8 MB to 1 GB, so that a memory card having a predetermined storage capacity can be used at will.

A memory card, which functions as the data recording section 9, has mode files previously recorded therein, which are read and used by the CPU 6. This mode file is a file in which appropriately set through experiments and simulations is a condition under which effective data can be acquired for identifying faulty conditions which have been previously assumed to be experienced by the vehicle. Specifically, the mode file describes basic information for permitting the recording apparatus 1 to acquire and record vehicle data.

FIG. 3 is an explanatory diagram showing examples of the mode files. Each of the code files is comprised of acquisition contents, an acquisition condition, and an operating condition. The acquisition contents indicates the type of vehicle data to be recorded. The acquisition condition refers to a condition under which vehicle data is acquired and recorded in accordance with the acquisition contents, and includes a sampling rate, a trigger condition, a recording time, and the like. The sampling rate indicates a period at which vehicle data is acquired, and a variety of periods are set in accordance with the acquisition contents. The trigger condition indicates a condition under which acquired vehicle data is recorded from the RAM 8 to the data recording section 9. The trigger condition may include a predetermined point (for example, the vehicle speed at 0 km/h, the engine rotation speed at 0 rpm) in a temporal transition of vehicle data, the ignition switch which is turned on, the generation of a fault code such as misfiring determination, the start and end of data acquisition, a MIL lamp which is turned on, and the like. The recording time indicates a temporal length of vehicle data stored in the data recording section 9 from the RAM 8, and may be, for example, ten minutes before and after the establishment of the trigger condition, and the like. The operating condition refers to a condition under which a transition is made to the termination of the operation of the recording apparatus 1 (shutdown processing, later described). Since the recording apparatus 1 must be temporally linked to the operation of the ECU 2 for recording vehicle data, the termination of the operation of the ECU 2 is basically set as this operating condition (operating condition (i) in FIG. 3).

When vehicle data is recorded in the data recording section 9 in accordance with acquisition contents and acquisition condition, it is presumably possible that the acquisition contents and acquisition condition are not satisfied in the subsequent operation cycle (completion of data recording). For example, as a mode file B shown in FIG. 3, where the acquisition condition states that vehicle data is recorded for ten minutes after the ignition switch 13 is turned on, the data recording is completed after the vehicle data is recorded in the data recording section 9 for ten minutes. In such a case, even if the ECU 2 continues to operate, the recording apparatus 1 hardly needs to operate because there occurs no situation in which vehicle data should be recorded. Therefore, the mode file also includes a secondary operating condition which is set on the condition that data recording is completed (operating condition (ii) in FIG. 3).

In the example shown in FIG. 3, a mode file A assumes rough idle as a faulty condition. According to this mode file A, the recording apparatus 1 acquires vehicle data such as the engine rotation speed, vehicle speed, intake pipe pressure, ignition advanced angle, fuel injection width, idle control valve control amount, and engine coolant temperature at the highest sampling rate (for example, 10 msec). Also, during a period in which vehicle data is being acquired, the vehicle data is recorded in the data recording section 9 for ten minutes before and after a timing at which established is a trigger condition which states that the engine rotation speed reaches zero rpm. Alternatively, vehicle data is recorded in the data recording section 9 for ten minutes before and after a timing at which is established a trigger condition which states that a changing amount in the engine rotation speed is equal to or more than a predetermined value. Then, in principle, the recording apparatus 1 terminates the acquisition and recording of vehicle data on the condition of the termination of the operation of the ECU 2, followed by a transition to the shut-down processing (when data recording is completed, a transition is made to the shut-down processing at this timing at which the data recording is completed). On the other hand, a mode file B assumes a defective engine start as a faulty condition, while a mode file C assumes abnormal vibrations such as surge as a faulty condition. Unlike these mode files, a mode file does not assume a particular faulty situation, but corresponds to a wide applications for acquiring minimum vehicle data in a variety of faulty situations.

A mode file is associated with a plurality of files each corresponding to a different faulty condition. Therefore, the recording apparatus 1 is installed in the vehicle, after mode files have been appropriately selected in correspondence to faulty situations of the vehicle in which the recording apparatus 1 is installed, are recorded on a memory card. The selection of the mode files and recording of the mode files on a memory card are performed by a service person with reference to diagnosis codes stored in a backup RAM of the ECU 2.

The operation section 10 comprises a remote controller provided with an operation switch. This remote controller can be operated by the driver. As the driver operates the operation switch, an operation signal is outputted from the operation section 10 to the CPU 6, causing the CPU 6 to record vehicle data recorded in the RAM 8 in the data recording section 9. In other words, a manipulation on the operation switch functions as a trigger condition at an arbitrary timing by a driver. The operation section 10 may further comprise input means such as a keyboard, a mouse, and the like.

The communication section 11 notifies the user of the completion of recording when the recording of vehicle data which satisfies the acquisition condition has appropriately completed. In this embodiment, the communication section 11 is mainly comprised of LED which is controlled to turn on or blink when the recording of vehicle data described in the acquisition condition is appropriately terminated. In this way, the user can be effectively notified of the completion of the recording of the vehicle data. Alternatively, the communication section 11 may comprise a CRT, a liquid crystal display, a speaker, or the like, and can employ a variety of configurations which can notify the driver of the completion of the recording.

The interface section 12 includes a variety of interfaces for sending and receiving data to and from the vehicle. The recording apparatus 1 is connected to the CAN or K-Line in the vehicle through the interface section 12 for bi-directional communications with the ECU 2 in the vehicle. In this way, the recording apparatus 1 can acquire control parameters from the ECU 2, and can know the situation of the ECU 2 such as the generation of a diagnosis code. Also, the interface section 12 is applied with output signals from a variety of sensors provided in the vehicle directly or indirectly through the ECU 2, and is also applied with signals associated with the ignition switch 13 when it is turned on and off (ON signal/OFF signal), and with a variety of signals (starting signals) which serve as triggers when the recording apparatus 1 is powered on, as will be later described. Further, the recording apparatus 1 can make bi-directional communications with a general-purpose computer (external PC) which is an external system connected thereto from the outside through the interface section 12.

The recording apparatus 1 is connected to the battery 14 (see FIG. 1) disposed in the vehicle, to operate with the power supplied from this battery 14. However, the recording apparatus 1 is provided with a sub-battery (not shown) for ensuring a power source required for the recording apparatus 1 to operate even if the power supply is shut down. The power stored in the sub-battery is supplied to a variety of circuits which make up the recording apparatus 1 as appropriate when an electric connection is cut off between the battery 14 and the recording apparatus 1. Also, though not shown in FIG. 2, the recording apparatus 1 is provided with a clocking function for defining a current date and time, and a timer function for detecting a timing of a predetermined period.

Figure 4:
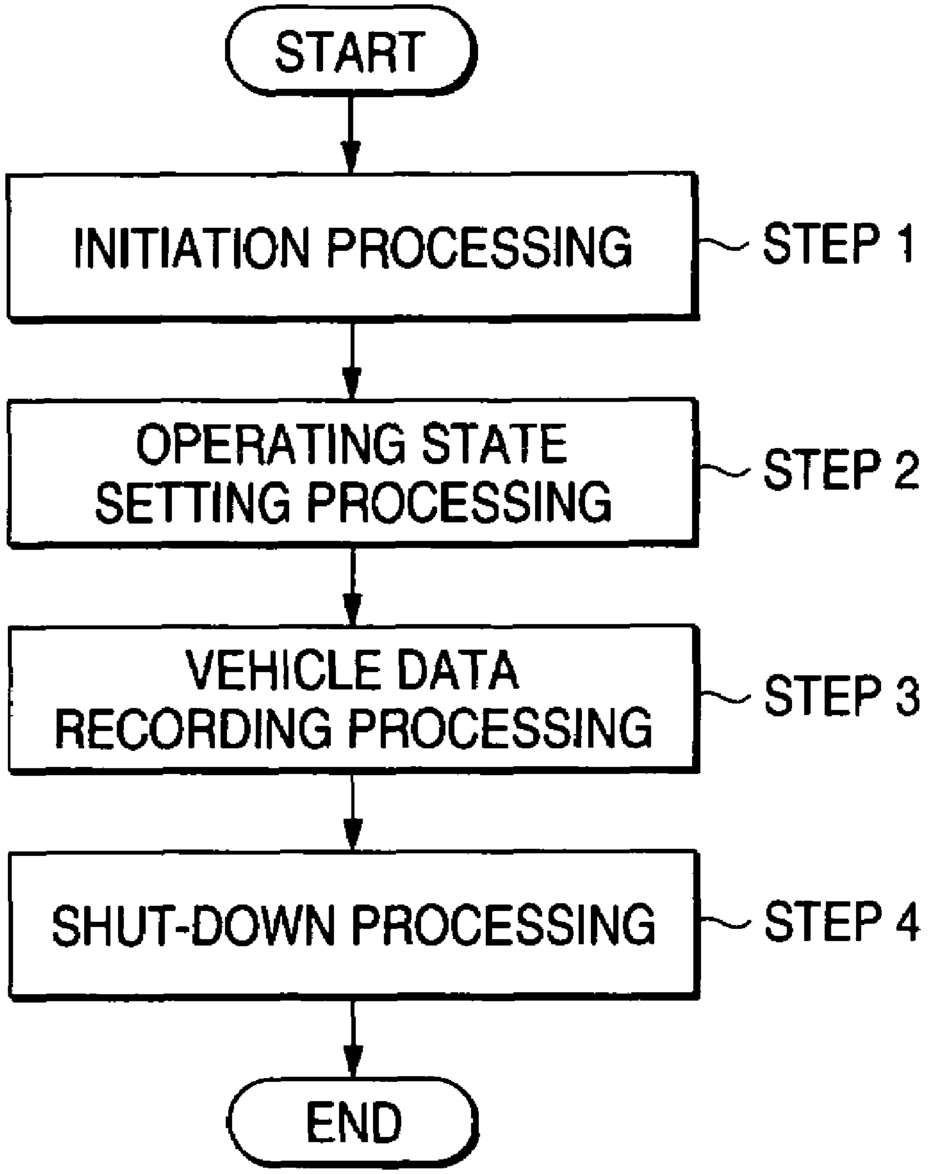
FIG. 4 is a flow chart illustrating a data recording procedure according to a first embodiment.

FIG. 4 is a flow chart illustrating a data recording procedure according to this embodiment. The procedure of the recording processing performed by the recording apparatus 1 is advanced in the order of initiation processing, operating state setting processing, data recording processing, and shut-down processing.

Initiation Processing (Step 1)

From a viewpoint of reducing power consumption of the battery 14, the recording apparatus 1 is basically powered off when the engine is stopped. Thus, the recording apparatus 1 is powered on at the time the vehicle is started, followed by the initiation of the system such as the operating system of a computer. In this event, the recording apparatus 1 preferably has initiated the system of the recording apparatus 1 before the ignition switch 13 is turned on such that vehicle data can be recorded upon starting the engine. Thus, the recording apparatus 1 performs the initiation processing using one of approaches 1-3 shown below or in combination of a plurality of approaches.

Approach 1 (Start before Ignition Switch 13 is Turned on)

When the ignition switch 13 is turned on, the driver's get-in behavior exists as its premise. As such, the recording apparatus 1 senses the driver's get-in behavior which is relied on to perform an initiation operation. The driver's get-in behavior can be sensed, for example, by a signal from a smart key system, unlocking of a door lock, seating on a seat, a touch to a door, vibrations of the vehicle caused by opening and closing the door. When the driver's get-in behavior is sensed by a sensor or the like, and a corresponding signal is inputted through the interface section 12 as a starting signal, the recording apparatus 1 is powered on in response to this signal.

Approach 2 (Initiation in Synchronism with On-Timing of Ignition Switch 13)

When the interface section 12 is applied with an ON-signal outputted from the ignition switch 13, the recording apparatus 1 is powered on based on this ON-signal. Alternatively, when the ignition switch 13 is turned on to cause a change in a communication signal on the CAN in the interface section 12, the recording apparatus 1 is powered on based on this change in the signal.

Approach 3 (Initiation after Ignition Switch 13 is Turned on)

The recording apparatus 1 is applied with a timer signal every predetermined time from a built-in timer (not shown)

and the recording apparatus 1 is powered on based on the timer signal. When the system is initiated in association with the power-on, the recording apparatus 1 outputs some data request signal to the ECU 2 in the vehicle. Generally, when the vehicle has started, the ECU 2 is operating, so that a signal in response to this data request signal should be outputted from the ECU 2. Thus, the recording apparatus 1 determines whether or not the vehicle has started based on whether or not the signal outputted from the ECU 2 has received. The recording apparatus 1 continues the initiated state when it receives a signal from the ECU 2. On the other hand, when the recording apparatus does not receive a predetermined signal, the power supply is turned off. Then, the power supply is again turned on in response to an applied timer signal, and repeatedly executes similar processing.

Other than the foregoing, a power supply switch may be provided on a remote controller equivalent to the operation section 10, such that the user himself may power on the recording apparatus 1 before the ignition switch 13 is turned on. In this case, the recording apparatus 1 is powered on based on a manipulation signal generated in response to the manipulation on the power supply switch.

Processing for Setting Operating State (Step 2)

When the recording apparatus is powered on to initiate the system, an operating state is set based on the mode file stored in the data recording section 9. Specifically, acquisition contents described in the mode file are read, and are set as vehicle data which should be acquired from the vehicle, and an acquisition condition is read to set a condition for acquiring and recording the vehicle data. In this way, the recording apparatus 1 is set in a state for performing acquisition/recording operations in accordance with the mode file.

Once the setting is made using the mode file, an operation history is referenced in subsequent setting processing. This operation history is information stored in the data recording section 9 in shut-down processing (step 4, later described), and describes the operating state of the recording apparatus 1 at the time the operation was terminated at the preceding time. By referencing the operation history, the recording apparatus 1 is restored to an operating state similar to the preceding operating state when it was shut down at the last time. In this way, since the operating state of the recording apparatus 1 can be made continuous in each operating cycle, this is effective when data is recorded over a plurality of cycles. As later described, this operation history records only minimally required contents for restoring the recording apparatus 1 to a state similar to the preceding operating state at the end thereof. For this reason, even is the operation history is read to restore the operating state, a time required therefor is shorter than a time required when the mode file is read. As a result, even when the vehicle data is recorded immediately after the recording apparatus 1 is started, it is possible to improve the responsibility to the recording operation of the recording apparatus 1.

Data Recording Processing (Step 3)

Figure 5:
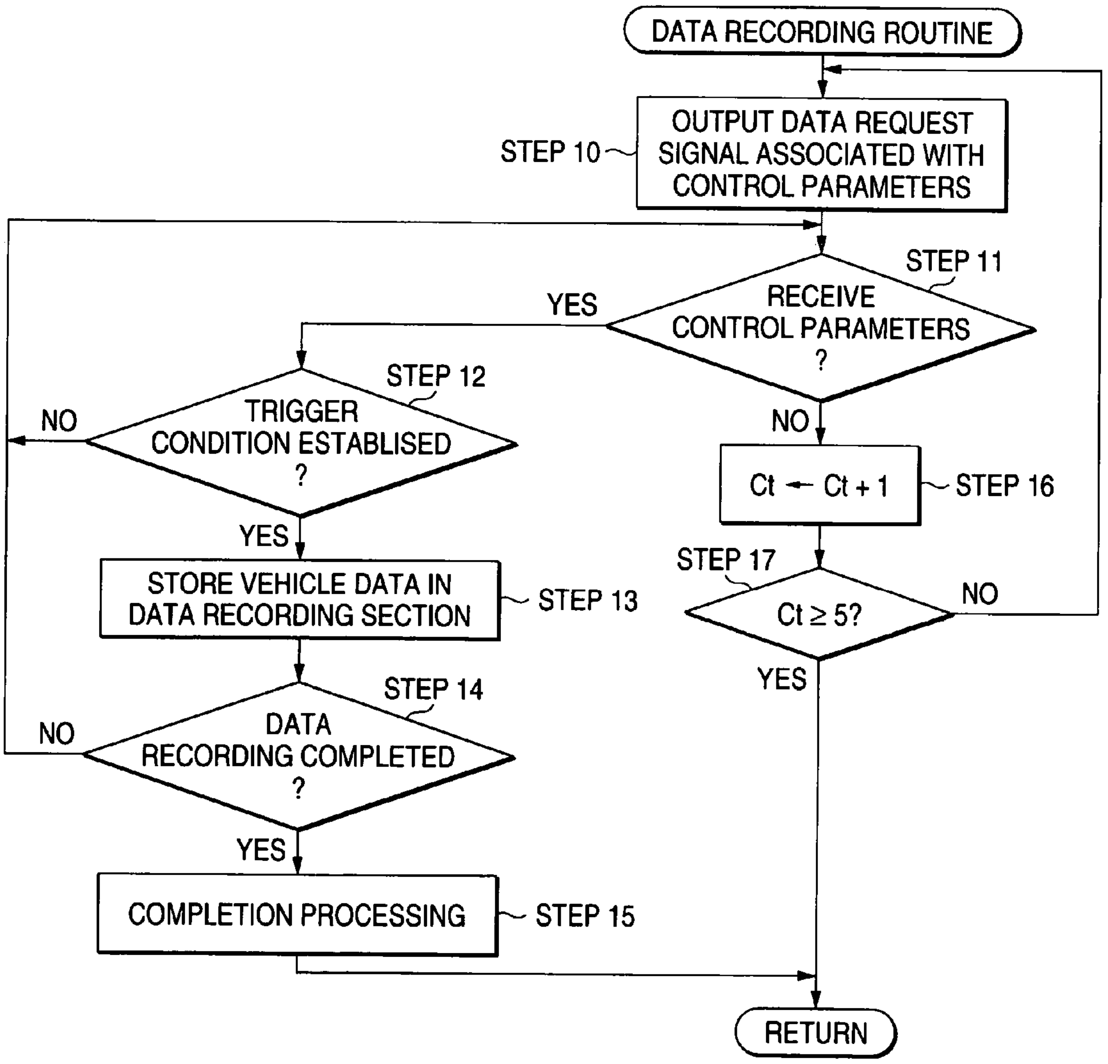
FIG. 5 is a flow chart illustrating a detailed procedure of data recording processing.

FIG. 5 is a flow chart illustrating a detailed procedure of the data recording processing at step 3. When the operating state is set at the preceding step 2, a data request signal is outputted to the ECU 2 for acquiring control parameters which a reset as the acquisition contents. The ECU 2 is executing a normal system as the vehicle is started, and upon receipt of the data request signal, outputs the control parameters in accordance with the acquisition contents to the recording apparatus, until its own operation ends, while executing the system control.

It is determined at step 11 whether or not control parameters have been received. When the determination is made as negative at this step 11, i.e., when the control parameters have not been received, the procedure proceeds to step 16, later described. On the other hand, when the determination is made as positive at step 11, i.e., when the control parameters have been received, the procedure proceeds to step 12. In this case, the received control parameters are acquired at a predetermined sampling rate, and the acquired control parameters are chronologically recorded in the RAM 8. Also, when the acquisition contents include vehicle data other than the control parameters of the ECU 2, i.e., signals detected by sensors and peripheral information, the recording apparatus 1 acquires these data as well through the interface section 12, and chronologically stores them in the RAM 8.

When data corresponding to the acquisition contents exists both in the control parameters (operated values) for the ECU 2 and the sensor detected signals, such as the engine rotation speed, the recording apparatus 1 can acquire the sensor detected signals together with the control parameters and store both data in the RAM 8. The peripheral information can be acquired as sensor detected signals from respective sensors by individually mounting the sensors for detecting the peripheral information together with the recording apparatus 1. However, when the vehicle is equipped with sensors capable of detecting such information (for example, a temperature meter and GPS), their output signals may be utilized.

At step 12, it is determined whether or not the trigger condition is established. When the determination is made as negative at step 12, i.e., when the trigger condition is not established, the procedure returns to step 11. On the other hand, when the determination is made as positive at step 12, i.e., when the trigger condition is established, the vehicle data stored in the RAM is recorded in the data recording section 9 in accordance with the acquisition condition (step 13). For example, in a mode file A shown in FIG. 3, when the engine rotation speed being acquired falls down to zero rpm, the trigger condition is determined to be established. In this case, the vehicle data for five minutes before the timing at which the trigger condition is established is read from the RAM 8 and recorded in the data recording section 9. Together with this, the vehicle data stored in the RAM 8 for five minutes after the timing at which the trigger condition is established is recorded in the data recording section 9. In other words, the data recording section 9 stores a sequence of control parameters for a predetermined period which satisfies the previously set acquisition condition from among the vehicle data stored in the RAM 8.

Figure 6:
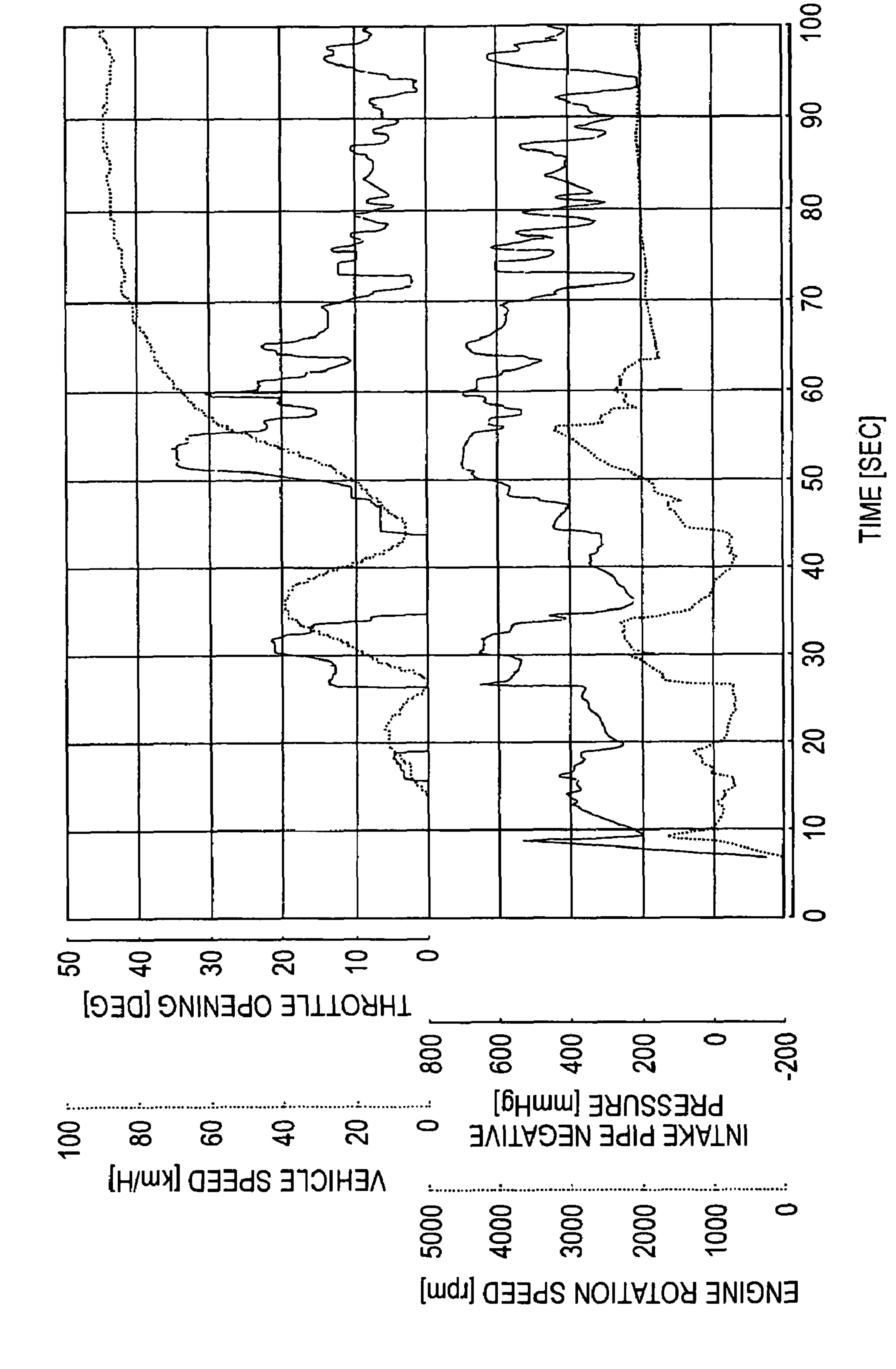
FIG. 6 is an explanatory diagram showing a change over time of chronological vehicle data recorded in a data recording section.

FIG. 6 is an explanatory diagram showing a change over Lime of chronological vehicle data recorded in the data recording section 9. FIG. 6 shows the vehicle data including the vehicle speed (km/h), throttle valve opening degree (deg), engine rotation speed (rpm), and intake pipe negative pressure (mmHg) As shown in FIG. 6, the vehicle data recorded in the data recording section 9 are recorded in correspondence to temporal information at the time of acquisition. Used for this time information is an absolute time represented by the date and time, or a relative time represented by a lapsed time from the start of recording.

At step 14, it is determined from the recording operation at step 13 whether or not the recording operation performed completely satisfies the completion of the data recording, i.e., the acquisition condition. When the determination is made as negative at step 14, i.e, when the data recording has not been completed, the procedure returns to step 11. On the other hand, when the determination is made as affirmative at step 14, i.e., the data recording has been completed, the procedure proceeds to step 15, followed by the exit of this routine after executing processing for terminating the recording operation.

In the processing for terminating the recording operation, the communication section 11 is controlled to turn on LED, and the acquisition of vehicle data outputted from the ECU 2 is stopped.

On the other hand, at step 16, the value of a counter Ct is incremented by "1." This counter Ct counts the number of times the control parameters are not received even though a data request signal is outputted to the ECU 2, and has been set to "1" in an initial routine performed in the event of the system initiation of the recording apparatus 1. At step 17 next to step 16, it is determined whether or not the value of the counter Ct reaches a predetermined value ("5" in this embodiment). The reason for which the determination is made as shown at step 17 is to determine whether or not the operation of the ECU 2 has terminated in order to make a transition to shut-down processing at the timing at which the operation of the ECU 2 has terminated. As shown in the operating condition in the mode file, the data recording operation terminates together with the termination of the operation of the ECU 2 to be recorded except for the case where data recording is completed within one operation cycle. Generally, each of control units which make up the ECU 2 has an operation termination timing which is set on an individual basis. For example, the ABS-ECU terminates its operation at the timing at which the ignition switch 13 is turned off, whereas the E/G-ECU 2*a* operates for a certain time period even after the ignition switch 13 is turned off, and then terminates the operation, and so forth. In this way, the operation terminates at a different timing depending on the ECU 2 to be recorded, so that the recording apparatus 1 itself is required to monitor the ECU 2 for an operating situation in order to terminate the data recording operation at an appropriate timing. As such, in this embodiment, the ECU 2 is determined as for the termination of the operation on the condition that no vehicle data is received from the ECU 2 even though a data request signal is outputted. However, since the ECU 2 can be temporarily inoperative, the recording apparatus 1 outputs the data request signal a predetermined number of times. Then, when no data has been received after outputting the data request signal this number of times (counter Ct≧5), this routine is exited in accordance with the affirmative determination at step 17.

Even during a sequence of data recording processing being performed, the recording apparatus 1 is still monitoring a power supply line connected to the battery 14 of the vehicle. When the power supply is shut down, the procedure proceeds to the shut-down processing at step 4. In this event, the recording apparatus 1 is supplied with the power from a sub-battery, not shown, and operates with this power.

Shut-Down Processing (Step 4)

The shut-down processing refers to the processing for shutting down the power supply to the recording apparatus 1, and in this shut-down processing, a current operating state of the recording apparatus 1 is confirmed in order to safely shut down the power supply. With this confirmation, the operating state of the recording apparatus 1 is classified into one of acquisition of vehicle data, recording of vehicle data, and completion of data recording. Here, during the acquisition of vehicle data, data is being acquired from the vehicle without establishment of the trigger condition. During the recording of vehicle data, vehicle data stored in the RAM 8 is being recorded in the data recording section 9 with establishment of the trigger condition. Except for the completion of data recording, the recording apparatus 1 continues the operation, so that operating state termination processing is next performed. Specifically, during the acquisition of vehicle data, the acquisition of vehicle data is stopped. On the other hand, during the recording of vehicle data, the acquisition of vehicle data is stopped, and unrecorded vehicle data is recorded in the data recording section 9.

As the operating state termination processing is performed, or when the data recording has been completed, the recording apparatus 1 records operation history data comprised of parameter information and state information in the data recording section 9 based on a confirmed current operating state. The parameter information is minimally required information for restoring the operating state upon termination at the next start, and includes acquisition contents, addresses in the RAM 8 at which data have been acquired, acquisition condition, and the like. The state information refers to the confirmed operating state of the recording apparatus 1, and one of acquisition of vehicle data, recording of vehicle data, and completion of data recording is recorded. As the operation history has been recorded, the power supply is shut down, thus terminating the shut-down processing.

As described above, according to this embodiment, it is determined by the recording apparatus 1 whether or not the operation of the ECU 2 has terminated for outputting vehicle data to be recorded. Then, when it is determined that the operation of the ECU 2 has terminated, the shut-down processing is executed at the timing at which the termination of the operation is determined for shutting down the power supply of the recording apparatus 1. In this way, the data recording processing of the recording apparatus 1 is continued as long as the ECU 2 continues to operate, thus making it possible to record necessary vehicle data without fail. With the intention of covering a termination timing of the ECU 2 which operates to the latest time, the operation termination timing of the recording apparatus 1 may be uniformly and fixedly set from turning-off of the ignition switch 13 to ensure the certainty of recording in vehicle data. However, this approach may possibly cause the operation of the ECU 2 to terminate earlier than the termination of the data recording processing, resulting in useless consumption of the power stored in the battery 14. However, according to the inventive approach, these timings are in synchronization, and this problem can therefore be solved. This can achieve the compatibility between an improvement in the reliability of recorded data and a reduction of power consumption in a battery.

Also, according to this embodiment, a transition is made to the shut-down processing when the data recording is completed within one operation cycle depending on the acquisition contents. When the recording of vehicle data, which satisfies the acquisition condition, has been appropriately completed, a secondary operating condition is applied to terminate the operation of the recording apparatus 1 before the ECU 2 terminates the operation. In this way, when necessary data has already been recorded, it is possible to achieve the compatibility between an improvement in the reliability of recorded data and a reduction of power consumption in a battery, which is the object of the invention, even if the operation of the recording apparatus 1 is terminated.

Second Embodiment

The second embodiment differs from the first embodiment in that a shut-down mode, indicative of a form for a transition from the data recording processing (step 3) to the shut-down processing (step 4) is switched in accordance with the acquisition contents or acquisition condition in the mode file. Switchable shut-down modes include a normal shut-down mode and an ignition shut-down mode. The normal shut-don mode executes the shut-down processing, in principle, at the timing at which the ECU 2 terminates the operation, as shown in the first embodiment. On the other hand, in the ignition shut-down mode, the shut-down processing is executed in principle at the timing at which the ignition switch 13 is turned off.

Generally, the shut-down mode for the recording apparatus 1 is consistently set to the normal shut-down mode. However, it is previously known that some ECU 2 to be recorded will terminate its operation together when the ignition switch 13 is turned off. When such an ECU 2 is to be recorded, a determination need not be directly made as to the termination of the operation of the ECU 2, but the termination of the operation can be indirectly identified from the state of the ignition switch 13. Therefore, assuming the ignition shut-down mode, an operating condition "a timing at which the ignition switch 13 is turned off" is set for a mode file which meets the acquisition contents or acquisition condition that involves such an ECU 2 being set to be recorded (not shown in FIG. 3).

Thus, in this embodiment, the CPU 6, which is responsible for main functions of the recording apparatus 1, is further responsible for the three functions shown below, in addition to the functions shown in the first embodiment.

(1) Monitor the interface section 12 to detect a signal which is associated with turn-off of the ignition switch 13, as indicated by the vehicle.

(2) Switch the normal shut-down mode and ignition shut-down mode in accordance with the acquisition contents or acquisition condition.

(3) Detect a timing at which the ignition switch 13 is turned off based on a signal associated with turn-on or turn-off of the ignition switch outputted from the vehicle, and execute the shut-down processing at the detected timing.

Figure 7:
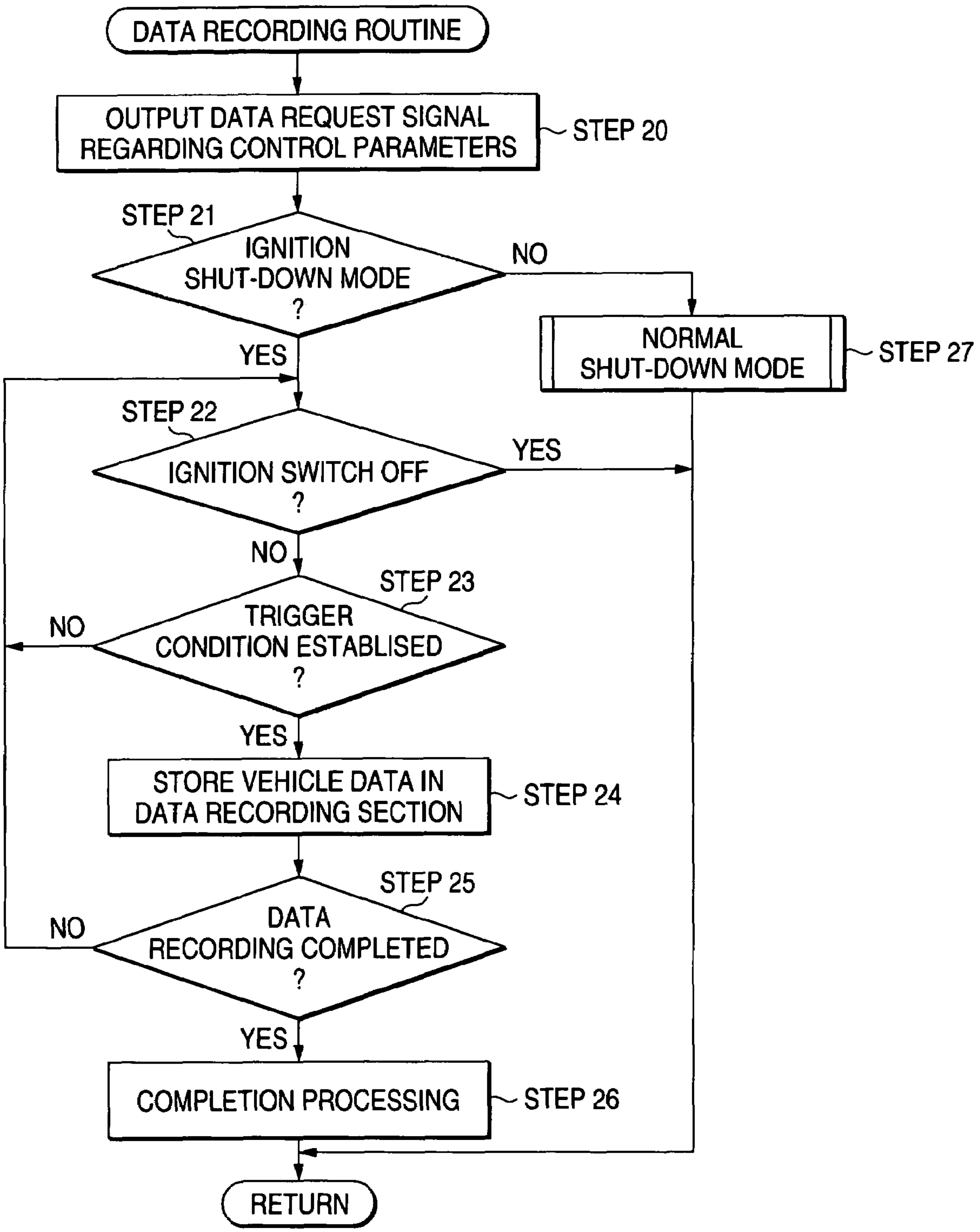
FIG. 7 is a flow chart illustrating a data recording procedure according to a second embodiment.

FIG. 7 is a flow chart illustrating a detailed procedure of the data recording processing according to the second embodiment. First, at step 20, a data request signal is outputted to the ECU 2 for acquiring control parameters which have been set as the acquisition contents. Upon receipt of the control parameters from the ECU 2 in response to the data request signal, the control parameters are acquired at a predetermined sampling rate, and the acquired control parameters are chronologically recorded in the RAM 8. Also, when the acquisition contents include vehicle data other than the control parameters for the ECU 2, i.e., sensor detected signals and peripheral information, the recording apparatus 1 acquires these data as well through the interface section 12, and chronologically stores them in the RAM 8.

At step 21, it is determined based on a currently set mode file whether or not the ignition shut-down mode should be selected. When the determination is made as affirmative at step 21, i.e., when an item stating "timing at which the ignition switch 13 is turned off" exists in the operating condition of the mode file, the procedure proceeds to step 22. On the other hand, when the determination is made as negative at step 21, i.e., when the item stating "timing at which the ignition switch 13 is turned off" does not exist in the operating condition of the mode file, the procedure proceeds to step 27. Then, at step 27, the processing shown at the aforementioned step 11 to step 17 in FIG. 5 is executed in accordance with the normal shut-down mode.

At step 22, it is determined whether or not the ignition switch 13 is turned off. When the determination is made as affirmative at step 22, i.e., when the CPU 6 detects a signal associated with turn-off of the ignition switch 13, this routine is exited, followed by a transition to the shut-down processing (step 4). On the other hand, when the determination is made as negative at step 22, i.e., when the CPU 6 does not detect the signal associated with turn-off of the ignition switch 13, the procedure proceeds to step 23.

At step 23, it is determined whether or not the trigger condition is established. When the determination is made as negative at step 23, i.e., when the trigger condition is not established, the procedure returns to step 22. On the other hand, when the determination is made as positive at step 23, i.e., when the trigger condition is established, vehicle data stored in the RAM 8 is recorded in the data recording section 9 in accordance with the acquisition condition (step 24). Then, at step 25, it is determined from the recording operation at step 13, whether or not the recording operation performed fully satisfies the completion of the data recording, i.e., the acquisition condition. When the determination is made as negative at step 23, i.e, when the data recording has not been completed, the procedure returns to step 22. On the other hand, when the determination is made as affirmative at step 25, i.e., the data recording has been completed, the procedure proceeds to step 26, followed by the exit of this routine after executing processing for terminating the recording operation.

As described above, according to this embodiment, the normal shut-down mode and ignition shut-down mode are switched in accordance with the acquisition condition and acquisition contents. Thus, when it is previously known that the ECU 2 terminates the operation as the ignition switch 13 is turned off, the termination of the operation of the ECU 2 can be determined without directly determining the termination of the operation of the ECU 2, so that the processing executed by the computer can be simplified. Also, in such a case, data need not be recorded after a timing at which the ignition switch 13 is turned off. Therefore, even if the operation of the recording apparatus 1 is terminated using the ignition shut-down mode, it is possible to achieve the compatibility between an improvement in the reliability of recorded data and a reduction of power consumption in a battery, which is the object of the invention.

The data recording section 9 is not limited to a memory card of flash memory type, but a variety of recording media can be widely applied, such as a magnetic type, an optical type, and the like. In this case, vehicle data stored in the RAM 8 is stored on a recording medium through a variety of drives controlled by the CPU 6. As will be understood from the foregoing, the data recording section 9 in the invention need not be an essential component of the recording apparatus 1. In other words, the recording apparatus 1 is required to be capable of at least recording vehicle data in the data recording section 9. However, the data recording section 9 need not be removable, but may be integrated with the recording apparatus 1.

It will be understood to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A data recording apparatus for recording a control parameter in a control unit in a vehicle, said apparatus comprising:

a determination section configured to output a data request signal to the control unit and configured to determine whether an operation of the control unit has terminated based on whether said control parameter from the control unit is received by said determination section in response to the data request signal, said operation outputting the control parameter to be recorded; and a control section configured to shut down a power supply to the data recording apparatus, at a timing at which a termination of the operation is determined, when the determination section determines that the control unit terminates the operation.

2. The data recording apparatus according to claim 1, wherein, when the determination section receives data in response to the data request signal, the determination section determines that the control unit continues to operate, and wherein, when the determination section does not receive data in response to the data request signal, the determination section determines that the control unit terminates the operation.

3. A data recording apparatus for recording a control parameter in a control unit in a vehicle, said apparatus comprising:

a determination section configured to output a data request signal to the control unit and configured to determine whether an operation of the control unit has terminated based on whether said control parameter from the control unit is received by the determination section in response to the data request signal, the operation outputting the control parameter to be recorded;

a detection section configured to detect a signal outputted from the vehicle in association with a turning off of an ignition switch; and a control section having a plurality of switchable shut-down modes comprising a first shut-down mode and a second shut-down mode, wherein the control section executes a shut-down processing configured to shut down power supply to the data recording apparatus at a timing at which a termination of the operation is determined when the determination section determines that the control unit terminates the operation in the first shut-down mode, wherein the control section executes the shut-down processing at a timing at which a detection is made when the detection section detects the signal outputted in association with the turning off of the ignition switch in the second shut-down mode, and wherein the control section switches the first shut-down mode and the second shut-down mode in accordance with acquisition contents indicative of a type of the control parameter to be recorded and an acquisition condition indicative of a condition under which the control parameter can be acquired to effectively identify a faulty condition of the vehicle.

4. A method of shutting down a recording apparatus for recording a control parameter in a control unit in a vehicle, comprising:

outputting a data request signal to the control unit and determining whether an operation of the control unit has terminated based on whether said control parameter from the control unit is received in response to the data request signal, the operation for outputting the control parameter to be recorded; and executing shut-down processing for shutting down a power supply to the data recording apparatus at a timing at which a termination of the operation is determined when said determining whether the operation of the control unit has terminated occurs.

5. The method according to claim 4, further comprising:

determining that the control unit continues to operate, when data in response to the data request signal is received; and determining that the control unit terminates the operation, when the data in response to the data request signal is not received.

6. A method of shutting down a recording apparatus for recording a control parameter in a control unit in a vehicle, comprising:

switching a plurality of switchable shut-down modes comprising a first shut-down mode and a second shut-down mode, in accordance with acquisition contents indicative of a type of the control parameter to be recorded and an acquisition condition indicative of a condition under which the control parameter can be acquired for effectively identifying a faulty condition of the vehicle; and executing processing in accordance with the switched shut-down mode, said executing comprising:

outputting a data request signal to the control unit and determining whether an operation of the control unit has terminated based on whether said control parameter from the control unit is received in response to the data request signal, the operation for outputting the control parameter to be recorded;

executing shut-down processing for shutting down a power supply to the data recording apparatus at a timing at which a termination of the operation is determined said determining whether the operation of the control unit has terminated occurs, in the first shut-down mode;

detecting a signal outputted from the vehicle in association with a turning off of an ignition switch; and executing the shut-down processing at a timing at which the signal is detected when detecting the signal outputted in association with the turning off of the ignition switch, in the second shut-down mode.

7. The data recording apparatus according to claim 1, wherein the termination of the operation of the control unit corresponds in timing to a termination of an operation of the data recording apparatus.

8. The data recording apparatus according to claim 1, wherein a central processing unit (CPU) comprises said determination section and said control section.

9. The data recording apparatus according to claim 8, further comprising:

a memory device configured to store data processed by the CPU, said memory device connected to said CPU;

a data recording section configured to record data stored in the memory device, said data recording section connected to said CPU;

an operation section connected to said CPU to cause the CPU to record vehicle data stored in the memory device to the data recording section, said operation section comprising a remote controller provided with an operation switch, said operation switch configured to control said CPU;

a communication section connected to said CPU to notify a user of completion of recording; and an interface section connected to said CPU to allow a plurality of devices to send and receive data from the CPU.

10. The data recording apparatus according to claim 9, further comprising:

a removable non-volatile memory unit configured to store data recorded by said data recording section; and a socket configured to provide one of said CPU and said recording access to said removable non-volatile memory unit, wherein said CPU records data equivalent to said data recorded by said data recoding section on said removable non-volatile memory unit.

11. The data recording apparatus according to claim 9, wherein said data recording section comprises a removable non-volatile memory unit configured to store data, and wherein said CPU records data on said memory unit.

12. The method of shutting down the recording apparatus according to claim 4, wherein said executing shut-down processing occurs when an engine of said vehicle is stopped, and wherein said recording apparatus remains shut down until said recording apparatus anticipates a staffing of said engine of said vehicle.

13. The data recording apparatus according to claim 1, wherein said recording apparatus records operation history data comprising said control parameter in a data recording section.

14. The data recording apparatus according to claim 13, wherein said shutting down of said power supply occurs after said recording apparatus records said operation history data.

15. The data recording apparatus according to claim 2, wherein data is recorded while said control unit is operational.

16. The data recording apparatus according to claim 3, wherein a central processing unit (CPU) comprises said determination section and said control section.

17. The data recording apparatus according to claim 16, further comprising:

a memory device configured to store data processed by the CPU, said memory device connected to said CPU;

a data recording section configured to record data stored in the memory device, said data recording section connected to said CPU;

an operation section connected to said CPU to cause the CPU to record vehicle data stored in the memory device to the data recording section, said operation section comprising a remote controller provided with an operation switch, said operation switch configured to control said CPU;

a communication section connected to said CPU to notify a user of completion of recording; and an interface section connected to said CPU to allow a plurality of devices to send and receive data from the CPU, wherein said CPU monitors said interface section to detect a signal which is associated with the turning off of said ignition switch.

18. The data recording apparatus according to claim 3, further comprising:

a mode file previously recorded in a data recording section to record data stored in a memory device, said data recording section connected to a CPU;

wherein the first shut-down mode and the second shut-down mode are switched based on an operating condition stored in the mode file, said operating condition determined in accordance with one of said acquisition contents and said acquisition condition.

19. The data recording apparatus according to claim 18, wherein, when an item stating "timing at which the ignition switch is turned off" exists in said operating condition of said mode file and the ignition switch is turned off, the shut-down processing is executed without said determination section determining whether said control unit is terminated.

20. The method according to claim 6, wherein the first shut-down mode and the second shut-down mode are switched based on an operating condition stored in a mode filed previously recorded in a data recording section to record data stored in a memory device, said data recording section connected to a CPU, and wherein the operating condition is determined in accordance with one of said acquisition contents or said acquisition condition.

21. The method according to claim 20, wherein, when an item stating "timing at which the ignition switch is turned off" exists in the operation condition of the mode file and the ignition switch is turned off, said executing shut-down processing is executed without said determining whether said operation of the control unit has terminated.

22. The data according apparatus according to claim 1, wherein the data request signal is outputted to acquire the control parameter which is set as acquisition content included in a mode file previously recorded in a data recording section.

23. The data recording apparatus according to claim 3, wherein the data request signal is outputted to acquire the control parameter which is set as acquisition content included in a mode file previously recorded in a data recording section.

24. The method according to claim 4, further comprising:

outputting the data request signal for acquiring the control parameter which is set as acquisition content included in a mode file previously recorded in a data recording section.

25. The method according to claim 6, further comprising:

outputting the data request signal for acquiring the control parameter which is set as acquisition content included in a mode file previously recorded in a data recording section.

* * * * *